United States Patent
Sun et al.

(10) Patent No.: US 12,298,909 B2
(45) Date of Patent: May 13, 2025

(54) MEMORY PREFETCH BASED ON MACHINE LEARNING

(71) Applicant: Sandisk Technologies, Inc., Milpitas, CA (US)

(72) Inventors: Chao Sun, San Jose, CA (US); Qingbo Wang, Irvine, CA (US); Minghai Qin, Fremont, CA (US); Jaco Hofmann, Santa Clara, CA (US); Anand Kulkarni, San Jose, CA (US); Dejan Vucinic, San Jose, CA (US); Zvonimir Bandic, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/231,730

(22) Filed: Aug. 8, 2023

(65) Prior Publication Data
US 2024/0193088 A1    Jun. 13, 2024

Related U.S. Application Data

(60) Provisional application No. 63/430,949, filed on Dec. 7, 2022.

(51) Int. Cl.
*G06F 12/0862* (2016.01)
*G06N 20/00* (2019.01)

(52) U.S. Cl.
CPC ......... *G06F 12/0862* (2013.01); *G06N 20/00* (2019.01)

(58) Field of Classification Search
CPC .............................. G06F 12/0862; G06N 20/00
See application file for complete search history.

(56) References Cited

U.S. PATENT DOCUMENTS 8,806,177 B2    8/2014  Krieger et al.
10,877,889 B2 *  12/2020 Roberts ............... G06F 12/0862
(Continued)

FOREIGN PATENT DOCUMENTS

EP    3982269 A1    4/2022

OTHER PUBLICATIONS

Astera Labs; "Leo CXL Memory Accelerators"; accessed Aug. 6, 2023; available at: https://www.asteralabs.com/products/cxl-memory-platform/leo-cxl-memory-connectivity-platform/.

(Continued)

*Primary Examiner* — Mark A Giardino, Jr.
(74) *Attorney, Agent, or Firm* — Patterson + Sheridan, LLP

(57) ABSTRACT

A memory device includes a first memory and a second memory that caches data stored in the first memory. At least one controller of the memory device receives page fault information from a host. The page fault information results from a request for data by the host that is stored in the first memory but is not cached in the second memory when requested by the host. The memory device uses the received page fault information for one or more inputs into a prefetch model trained by Machine Learning (ML) to generate at least one inference. Based at least in part on the at least one inference, prefetch data is cached in the second memory. In one aspect, the page fault information is used to train the prefetch model. In another aspect, the page fault information includes at least one virtual address used by the host for the requested data.

19 Claims, 6 Drawing Sheets

(56) References Cited

U.S. PATENT DOCUMENTS

| | | | | |
|---|---|---|---|---|
| 2007/0143547 | A1* | 6/2007 | Farmer | G06F 12/0862 711/137 |
| 2014/0281364 | A1* | 9/2014 | Buschardt | G06F 12/10 711/207 |
| 2020/0293456 | A1* | 9/2020 | Ramadoss | G06F 12/1009 |
| 2021/0109679 | A1 | 4/2021 | Bernat et al. | |
| 2021/0342155 | A1* | 11/2021 | Homer | G06F 9/3861 |
| 2022/0398160 | A1* | 12/2022 | Zou | G06F 11/1435 |
| 2024/0045806 | A1* | 2/2024 | Seok | G06F 12/0862 |

OTHER PUBLICATIONS

Calciu et al.; "Rethinking Software Runtimes for Disaggregated Memory"; Apr. 2021; available at: https://dl.acm.org/doi/10.1145/3445814.3446713.

Denys Haryachyy; "Learning DPDK: Huge pages"; Apr. 2019; available at: https://haryachyy.wordpress.com/2019/04/17/learning-dpdk-huge-pages/.

Jamilan et al.; "APT-GET: Profile-Guided Timely Software Prefetching"; Apr. 2022; available at: https://dl.acm.org/doi/abs/10.1145/3492321.3519583.

Maruf et al.; "TPP: Transparent Page Placement for CXL-Enabled Tiered Memory"; May 2023; available at: https://arxiv.org/abs/2206.02878.

Redding Traiger; EE world online; "Memory accelerator SoC solves memory capacity/bandwidth bottlenecks in data centers and the Cloud"; Dec. 2021; available at: https://www.eeworldonline.com/memory-accelerator-soc-solves-memory-capacity-bandwidth-bottlenecks-in-data-centers-and-the-cloud/.

Samsung Newsroom website; "Samsung Unveils Industry-First Memory Module Incorporating New CXL Interconnect Standard"; May 2021; available at: https://news.samsung.com/global/samsung-unveils-industry-first-memory-module-incorporating-new-cxl-interconnect-standard.

Thekernal.org website; "The Linux kernel user's and administrator's guide; Memory Management; Concepts overview"; accessed on Aug. 6, 2023; available at: https://www.kernel.org/doc/html/v5.9/admin-guide/mm/concepts.html.

Viktor K. Prasanna; "ML-driven Memory Prefetcher"; Data Science Lab; University of Southern California; accessed on Aug. 6, 2023; available at: https://sites.usc.edu/dslab/.

Yoon et al.; "Design of DRAM-NAND flash hybrid main memory and Q-learning-based prefetching method"; May 2018; available at https://link.springer.com/article/10.1007/s11227-018-2421-7.

Zhang et al.; "RAOP: Recurrent Neural Network Augmented Offset Prefetcher"; Sep. 2020; available at: https://dl.acm.org/doi/10.1145/3422575.3422807.

* cited by examiner

MEMORY PREFETCH BASED ON MACHINE LEARNING

CROSS-REFERENCE TO RELATED APPLICATION

This application claims the benefit of U.S. Provisional Application No. 63/430,949 titled "MEMORY PREFETCH BASED ON MACHINE LEARNING", filed on Dec. 7, 2022, which is hereby incorporated by reference in its entirety.

BACKGROUND

Caching has been used in systems to store frequently accessed data or data that is predicted to be accessed in a memory that can be accessed quicker than a secondary memory that may have a larger capacity but a greater latency in accessing the data. Prefetch algorithms have been developed to prefetch data that is predicted to be accessed so that the prefetched data can be cached in the faster memory to improve system performance. Conventional prefetch algorithms typically use an incrementing process to increment addresses of data currently being accessed to prefetch data for the incremented addresses.

Machine Learning (ML) has recently been proposed to better predict or infer which data should be cached. However, it is still generally difficult to predict from a large number of unique address values (e.g., tens of millions of unique addresses) which data to cache in the faster memory, because such ML prefetch algorithms are typically inefficient at predicting complex access patterns that may access data across page boundaries. In this regard, an Operating System (OS) of a host may assign contiguous virtual pages used by the host into seemingly random physical pages of memory.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Systems

Figure 1:
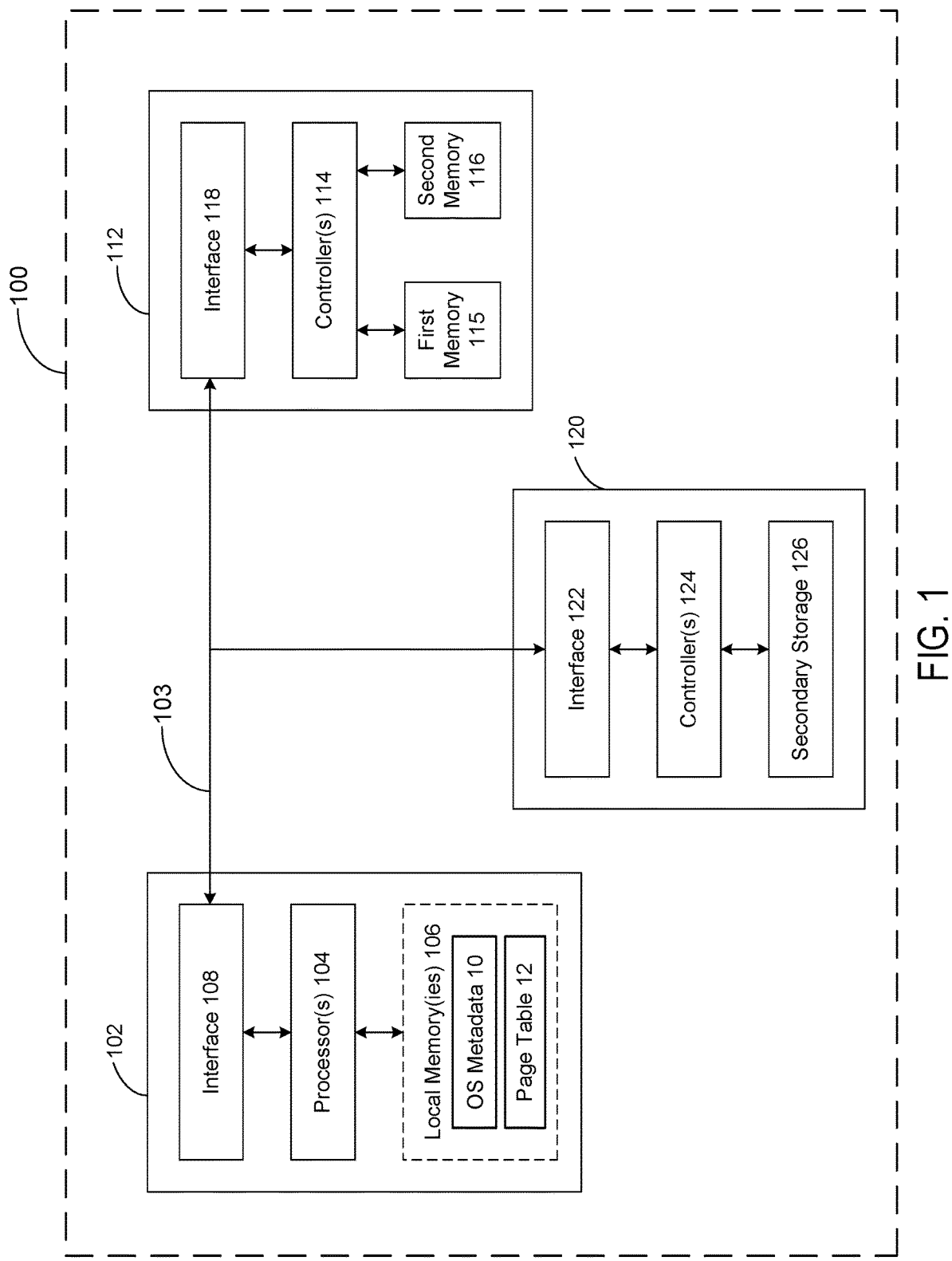
FIG. 1 is a block diagram of an example system including a memory device according to one or more embodiments.

FIG. 1 is a block diagram of example system 100 including memory device 112 according to one or more embodiments. As shown in FIG. 1, system 100 includes host 102, memory device 112, and storage device 120. System 100 in FIG. 1 may function as, for example, a computer system, such as a laptop, desktop, notebook computer, tablet, or other computing device. In some implementations, host 102 and one or both of memory device 112 and storage device 120 may be housed separately, such as where host 102 may be a client accessing a server including one or both of memory device 112 and storage device 120. In other implementations, host 102, memory device 112, and storage device 120 may be housed together as part of a single electronic device, such as, for example, a network media player, portable media player, Set-Tob Box (STB), Digital Video Recorder (DVR), or Network Attached Storage (NAS).

Host 102 includes one or more processors 104, interface 108, and optionally one or more local memories 106. Processor(s) 104 can include, for example, circuitry such as one or more Central Processing Units (CPUs), Graphics Processing Units (GPUs), microcontrollers, Digital Signal Processors (DSPs), Application-Specific Integrated Circuits (ASICs), Field Programmable Gate Arrays (FPGAs), hard-wired logic, analog circuitry and/or a combination thereof. In this regard, each processor 104 may comprise a multi-core processor or each processor 104 can represent a single processing core. In some implementations, a processor 104 can include a System on a Chip (SoC).

In addition, each processor 104 can include one or more levels of cache memory not shown in FIG. 1, such as an L1, L2, L3, and/or L4 cache, with the highest level cache being used as a Last Level Cache (LLC) (e.g., an L2, L3, or L4 cache depending on the levels of cache included in the processor 104) that caches data requested by the processor 104 or is expected to be accessed by the processor 104. In some implementations, each processor 104 can include a cache controller to control the operation of their respective cache memories to retrieve data from a local memory 106 or from memory device 112 via interconnect 103 and store the retrieved data in a cache memory of the processor 104.

Host 102 can communicate with memory device 112 and storage device 120 using interface 108 via interconnect 103, which can include, for example, a Compute Express Link (CXL) bus, Peripheral Component Interconnect express (PCIe) bus, a Network on a Chip (NoC), or another type of bus or network. In this regard, each processor 104, memory device 112, and storage device 120 can include an interface for communicating on interconnect 103. In other implementations, host 102 may use multiple interfaces 108 for multiple processors 104 communicating on interconnect 103.

Host 102 may also include its own local memory or memories 106, which can include, for example, a Dynamic Random Access Memory (DRAM), Static Random Access Memory (SRAM), Magnetoresistive RAM (MRAM), or other high-speed RAM or Storage Class Memory (SCM). In the example of FIG. 1, a local memory 106 of host 102 stores Operating System (OS) metadata 10 and page table 12, which can be used by an OS of host 102. The OS of host 102 (e.g., OS 27 in FIG. 2) may be stored in a local memory 106 or may be stored in second memory 116 of memory device 112 and may be used by the host to allocate resources of system 100, such as memory and processing resources.

OS metadata 10 and page table 12 may additionally or alternatively be stored in second memory 116 of memory device 112 in some implementations. As discussed in more detail below, OS metadata 10 may include, for example, a page fault rate, timestamps indicating the occurrences of page faults, and resource usage information for system 100, such as an indication of an amount of data being accessed by one or more processors 104 within a period of time or an activity level of a processor 104. Page table 12 can include a data structure used by the OS to map virtual addresses for data to physical memory addresses in a local memory 106 or in memory device 112 where the data is stored.

Memory device 112 includes interface 118 for communicating on interconnect 103 and one or more controllers 114 for controlling access to data stored in first memory 115 and second memory 116. Controller(s) 114 can include, for example, circuitry such as a hardware controller or other processing circuitry including hard-wired logic, analog circuitry and/or a combination thereof. As discussed in more detail below, second memory 116 caches data stored in first memory 115 for faster access to the data by host 102. Controller 114 uses a prefetch model trained by Machine Learning (ML) to determine which data to cache from first memory 115 in second memory 116. Notably, the training of the prefetch model is at least in part based on page fault information provided by host 102.

Although both first memory 115 and second memory 116 can be used as system memory by host 102, data stored in second memory 116 can be retrieved by host 102 faster than data stored only in first memory 115. In some implementations, second memory 116 can include, for example, DRAM or another type of solid-state memory or SCM such as MRAM that can be accessed faster than first memory 115. First memory 115 can include, for example, a Low-Latency Flash (LLF) memory or other type of solid-state memory with a relatively low data access latency as compared to secondary storage 126, but that is still slower than that of second memory 116.

While the description herein refers to solid-state memory generally, it is understood that solid-state memory may comprise one or more of various types of memory devices such as flash integrated circuits, NAND memory (e.g., Single-Level Cell (SLC) memory, Multi-Level Cell (MLC) memory (i.e., two or more levels), or any combination thereof), NOR memory, EEPROM, Chalcogenide RAM (C-RAM), Phase Change Memory (PCM), Programmable Metallization Cell RAM (PMC-RAM or PMCm), Ovonic Unified Memory (OUM), Resistive RAM (RRAM), Ferroelectric Memory (FeRAM), MRAM, 3D-XPoint memory, and/or other discrete Non-Volatile Memory (NVM) chips, or any combination thereof.

Storage device 120 can include, for example, a Solid-State Drive (SSD), a Hard Disk Drive (HDD), or a Solid-State Hybrid Drive (SSHD) including both disk media and solid-state media. Data stored in storage device 120 may be accessed by host 102 or memory device 112 via interconnect 103. Storage device 120 can use interface 122 to communicate on interconnect 103. Secondary storage 126 of storage device 120 can include one or more rotating magnetic disks or another type of storage media that has a slower access latency than first memory 115 and second memory 116 of memory device 112. One or more controllers 124 control access to data stored in secondary storage 126. Storage controller(s) 124 can include, for example, circuitry such as a hardware controller or other processing circuitry including hard-wired logic, analog circuitry and/or a combination thereof.

As will be appreciated by those of ordinary skill in the art with reference to the present disclosure, the OS of host 102 may generate a page fault when a process executed by a processor 104 attempts to access data that it does not have permission to access or that has a virtual address that is not mapped by a Memory Management Unit (MMU) of the processor or its Translation Lookaside Buffer (TLB) to a physical address in the system memory (i.e., a physical address in a local memory 106 or in memory device 112). The OS may then generate page fault information, such as the virtual address for the requested data, the physical address (which may be determined in some cases by accessing page table 12), a process ID identifying the process that generated the request, a thread ID identifying a thread that generated the request, a program counter value indicating a physical address for a next instruction to be fetched after the request, and/or an indicator of a permission required for the requested data.

The present disclosure uses such page fault information to improve the prefetching of data in second memory 116 from first memory 115. Even though first memory 115 may be mapped to a virtual address space used by host 102, the OS of host 102 can generate page faults for data stored in first memory 115 but not cached in second memory 116 at the time of the request and determine page fault information that can be used to improve the prefetching of data in second memory 116. Host 102 can provide the page fault information to memory device 112 for one or more inputs into a prefetch model that provides at least one inference for prefetching data from first memory 115. In addition, such page fault information can be collected to train the prefetch model using ML to improve the inferences made by the prefetch model.

As will be appreciated by those of ordinary skill in the art with reference to the present disclosure, the OS of host 102 can also generate more conventional page faults for data stored in secondary storage 126 of storage device 120 but not cached in the system memory (i.e., local memory or memories 106 and memory device 112) at the time of the request. In such cases, the OS of host 102 can retrieve the data stored in secondary storage 126 for caching in the system memory.

Those of ordinary skill in the art will appreciate with reference to the present disclosure that other implementations of system 100 can include different components or a different arrangement of components. For example, other implementations of system 100 can include multiple hosts 102, multiple memory devices 112, or may not include storage device 120. As another example variation, host 102 may not include a local memory 106 and may only use memory device 112 as its system memory. In yet other variations, storage device 120 may include a smart Data Storage Device (DSD) that can serve as a host accessing memory device 112.

Figure 2:
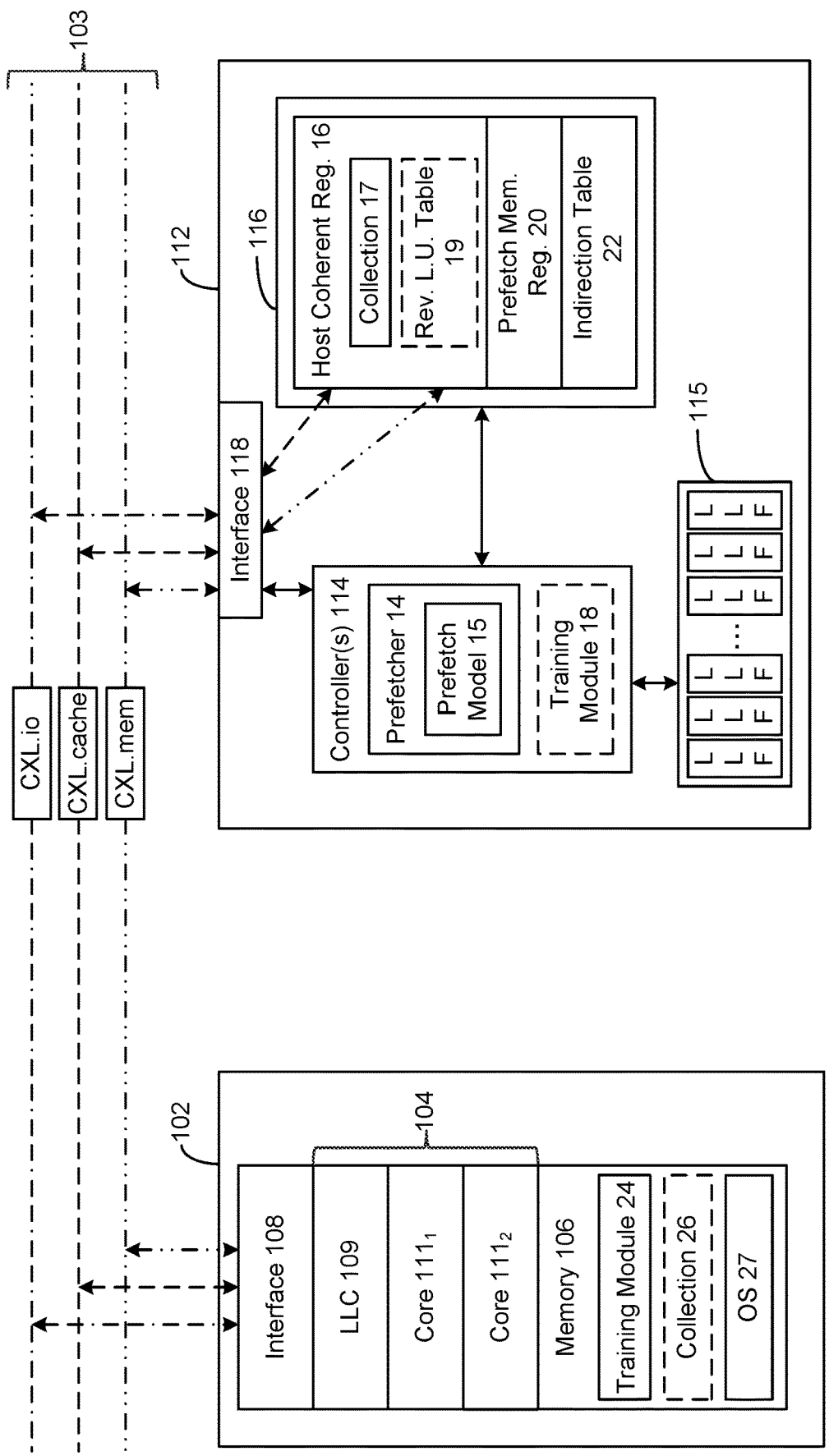
FIG. 2 is a block diagram of an example of a system including a Compute Express Link (CXL) memory device according to one or more embodiments.

FIG. 2 is a block diagram of an example where system 100 uses a CXL interconnect according to one or more embodiments. As shown in FIG. 2, host 102 includes processor 104 configured to communicate on interconnect 103 with memory device 112 via interface 108 using CXL. In this regard, memory device 112 can be referred to as a CXL memory device. In some implementations, system 100 can include other CXL devices, such as storage device 120, which may be referred to in such implementations as a CXL storage device. As appreciated by those of ordinary skill in the art with reference to the present disclosure, CXL can use different protocols for different types of memory communications on a PCIe physical layer.

In the example of FIG. 2, interconnect 103 uses a CXL.io protocol for providing a wide variety of types of communication between host 102 and memory device 112 and may be similar to a PCIe 5.0 protocol. Interconnect 103 also uses a CXL.cache protocol for allowing memory device 112 to access data and maintain coherency with data stored at host 102, and a CXL.mem protocol to allow host 102 to access data and maintain coherency with data stored in memory device 112. CXL interconnect 103 can enable data to remain coherent between host 102 and memory device 112 and enable pooling memory as a unified system memory. In the example of FIG. 2, memory 106 at host 102 can be pooled with first memory 115 and second memory 116 at memory device 112 into a unified system memory that can be mapped to a virtual address space used by processor 104.

In FIG. 2, the CXL.cache protocol can be used for cache coherent, host-aware data stored in host coherent region 16 of second memory 116. Host coherent region 16 can store, for example, metadata received from host 102, such as OS metadata 10 or other memory usage information. In some implementations, host coherent region 16 may also receive page fault information from host 102 and store a collection of page fault information in collection 17, which can include page fault information collected from multiple page faults caused by requested data stored in first memory 115 but not cached in second memory 116 at the time of the request. In addition, host coherent region 16 may also optionally store reverse lookup table 19. In some implementations, controller(s) 114 or prefetcher 14 may use reverse lookup table 19 to quickly translate physical addresses received from host 102 into virtual addresses used by host 102. The use of the CXL.cache protocol of CXL can provide a fast transfer of page fault information to memory device 112 to enable a timely use of the page fault information for prefetch model 15. In addition, the CXL.cache protocol can maintain the coherency of OS metadata and other data stored in host coherent region 16 so that prefetcher 14 can use the most up to date information provided by host 102.

As discussed above, the collection of page fault information, such as collection 17, can be used to train prefetch model 15 using ML. In some implementations, collection 17 can have a fixed buffer size, such as one kilobyte, so that when a certain amount of page fault information has been collected in collection 17, the collection of page fault information is used by host 102 to train prefetch model 15 to determine one or more updated weights for prefetch model 15. In other implementations, the retraining of prefetch model 15 may occur periodically (e.g., daily) and may use page fault information from collection 17, which may or may not be full. In some cases, newer page fault information may overwrite older page fault information in collection 17 if there is not enough room to store the new page fault information in collection 17 and training of prefetch model 15 has not been initiated. After training prefetch model 15, the page fault information from collection 17 may be erased to enable the collection of more page fault information.

In other implementations, the collection of page fault information may instead be stored at a local memory 106 of host 102, as with optional collection 26 stored in memory 106. The location of collection 26 may also correspond to a memory storing training module 24, which processor 104 may use to train prefetch model 15. In other implementations, a controller 114 of memory device 112 may instead be used to store a training module for prefetch model 15, such as with optional training module 18.

Prefetch model 15 can include, for example, a neural network with weights between nodes in the neural network that are determined by ML. In some implementations, one of cores $111_1$ or $111_2$ may serve as a helper core in executing training module 24 to train or retrain prefetch model 15. For example, core $111_2$ may be used to test run one or more applications to collect information on different memory accesses of the one or more applications during the test run. The collected memory accesses may then be used by training module 24 to train prefetch model 18, such as by determining an error between predicted or inferred prefetch data and data that was actually requested by the one or more applications during the test run. Page fault information from collection 17 or collection 26 may be used as inputs during the training to generate one or more inferences that can be compared to the data requested during the test run. The training process can result in one or more updated weights. Training module 24 may determine whether the updated weights vary from the corresponding current weights used by prefetch model 15 by more than a threshold value before determining whether to update one or more changed weights for prefetch model 15 to reduce downtime for prefetcher 14 and/or to avoid making changes that may not actually improve performance.

As noted above, ML can be useful for predicting less regular memory access patterns, such as those that do not increment physical addresses by a fixed stride. The machine learning implemented by training module 24 or training module 18 can include, for example, a history buffer to store historical access patterns, which may include page fault information from collection 17, data preprocessing, such as to use delta values to represent addresses of infrequently accessed pages, an embedding layer to map addresses to latent vectors, and a model, such as a Long Short-Term Memory (LSTM) model or a transformer model.

Previous approaches to using ML for prefetching data may include multi-layer perceptron based learning as in the paper by Alberto Ros, titled "BLUE: A Timely, IP-Based Data Prefetcher", 2021, available at: https://webs.um.es/aros/papers/pdfs/aros-mldpc21.pdf, which is hereby incorporated by reference in its entirety. Other approaches to ML for prefetching data can include reinforcement learning as in the paper by Rahul Bera et al., titled "Pythia: A Customizable Hardware Prefetching Framework Using Online Reinforcement Learning", October 2021, 54th Annual IEEE/ACM International Symposium on Microarchitecture, pgs. 1121-1137, or the paper by Jeong-Geun Kim et al, titled "Q-Selector-Based Prefetching Method for DRAM/NVM Hybrid Main Memory System", 2020, vol. 9 Electronics 2158, both of which are hereby incorporated by reference in their entireties. Yet other ML approaches to prefetching have included using a LSTM model as in the paper by Milad Hashemi et al., titled "Learning Memory Access Patterns", 2018, CML, vol. 80 of Proceedings of Machine Learning Research, pgs. 1924-1933, or the paper by Thaleia D.

Doudali et al., titled "Kleio: A Hybrid Memory Page Scheduler with Machine Intelligence", June 2019, HPDC '19: Proceedings of the 28th International Symposium on High-Performance Parallel and Distributed Computing, pgs. 37-48, both of which are hereby incorporated by reference in their entireties.

Training module 24 or training module 18 may use similar ML as the foregoing approaches but with different training inputs. In this regard, the foregoing approaches to using ML for prefetching data generally concern prefetching data from the system memory into the LLC of the processor, as opposed to predicting the data that will be needed further into the future so as to be useful for a longer access latency of first memory 115, which may include a flash memory, instead of the shorter access latency of conventional DRAM main memories. The ML approach of the present disclosure considers page fault information generated by the host that can include virtual addresses used by the host for requested data. The use of virtual addresses, in addition to other data collected by OS 27 of host 102, can further improve the accuracy of prefetch model 15 and the longevity of its predictions. In this regard, OS 27 may assign contiguous virtual pages of memory into seemingly random physical pages of memory. Considering the virtual addresses of requested data stored in first memory 115 but not stored in second memory 116 preserves the relationship between the requested virtual addresses that would not be available or acted upon if only considering the physical addresses.

In some implementations, the relationship between the virtual addresses may be inferred by using "huge" page sizes that are at least two megabytes, as compared to conventional page sizes of 4,096 bytes. For example, a page size of one gigabyte may be used so that sequential requests for data in a virtual address space are less likely to cross physical page boundaries and the data requests may generally be contiguous within the physical page, as opposed to being more scattered about different physical pages of memory when using a smaller page size. In such implementations of using a huge page size, the relationships gleaned from the virtual addresses may not be as significant as when using a smaller page size.

As shown in the example of FIG. 2, processor 104 is a CPU that includes LLC 109 and cores $111_1$ and $111_2$ that may share LLC 109. Each of cores $111_1$ and $111_2$ can include their own levels of cache, such as L1 and L2 caches and a cache controller that loads data into its caches from LLC 109. In addition, and as discussed in more detail below with reference to FIG. 3, processor 104 can include an MMU for loading data into LLC 109 from memory 106, first memory 115, and second memory, and for storing data from LLC 109 into memory 106, first memory 115, and second memory 116. The MMU (e.g., MMU 128 in FIG. 3) can translate virtual addresses used by processes executed by processor 104 to physical addresses in the memories and may also use a TLB (e.g., TLB 130 in FIG. 3) for accelerating the translation of virtual addresses.

In accessing data from second memory 116, interface 108 can use a CXL.mem protocol to obtain cache coherent access to data stored in prefetch memory region 20 of second memory 116. Prefetcher 14 of a controller 114 of memory device 112 can use page fault information received from host 102 as an input into prefetch model 15 to determine what data from first memory 115 should be cached in prefetch memory region 20 of second memory 116 for faster access by host 102 to such prefetched data. In some implementations, prefetcher 14 may also use OS metadata from OS 27, such as a page fault rate, a plurality of timestamps indicating the occurrences of page faults, and resource usage information by host 102 to determine at least one of an amount of data to prefetch from first memory 115 and when to prefetch data from first memory 115 for caching in second memory 116. The OS metadata and other memory access information may be accessed by prefetcher 14 from host coherent region 16 of second memory 116 using the CXL.cache protocol of interconnect 103.

The timestamps may be used, for example, to determine a number of page faults within a predetermined period of time, such as within an hour. The resource usage information can include, for example, an access rate of data from memory 106 and memory device 112 or an activity level of processor 104, such as a number of active processes or processor scheduling information. Such OS metadata (e.g., OS metadata 10 in FIG. 1) can be used by prefetcher 14 to set an aggressiveness of prefetching in terms of how often and how much data to prefetch that corresponds to a bandwidth or activity level of host 102 to better match a rate of consumption of the prefetched data. In this regard, prefetcher 14 may not always run prefetch model 15 every time memory device 112 receives page fault information from host 102, but may reduce the frequency of prefetching based on inferences from prefetch model 15 in response to OS metadata indicating that less data needs to be prefetched from first memory 115.

Second memory 116 in the example of FIG. 2 also stores indirection table 22, which may be used by controller(s) 114 (e.g., a flash manager, which may or may not be internal to first memory 115) for address indirection used, for example, for maintenance operations of first memory 115, such as garbage collection, wear leveling, or defect mapping. In FIG. 2, first memory 115 includes blocks and/or dies of LLF memory that may use address indirection via indirection table 22. In addition, a controller 114 may also provide other storage functions, such as encryption, deduplication, and/or compression of data stored in memory device 112.

Those of ordinary skill in the art will appreciate with reference to the present disclosure that other implementations of system 100 can include a different arrangement of components, data structures, or modules than shown in the example of FIG. 2. For example, host 102 in other implementations may include multiple processors 104 or system 100 may include multiple hosts that access memory device 112. In such implementations, memory device 112 may use different partitions of second memory 116 for the different hosts and may also use different prefetch models for the different hosts. In addition, other implementations may use a separate controller or a hardware accelerator of host 102 or of memory device 112 for training prefetch model 15. Memory device 112 may use a separate controller or a hardware accelerator for implementing prefetcher 14 and/or prefetch model 15.

Figure 3:
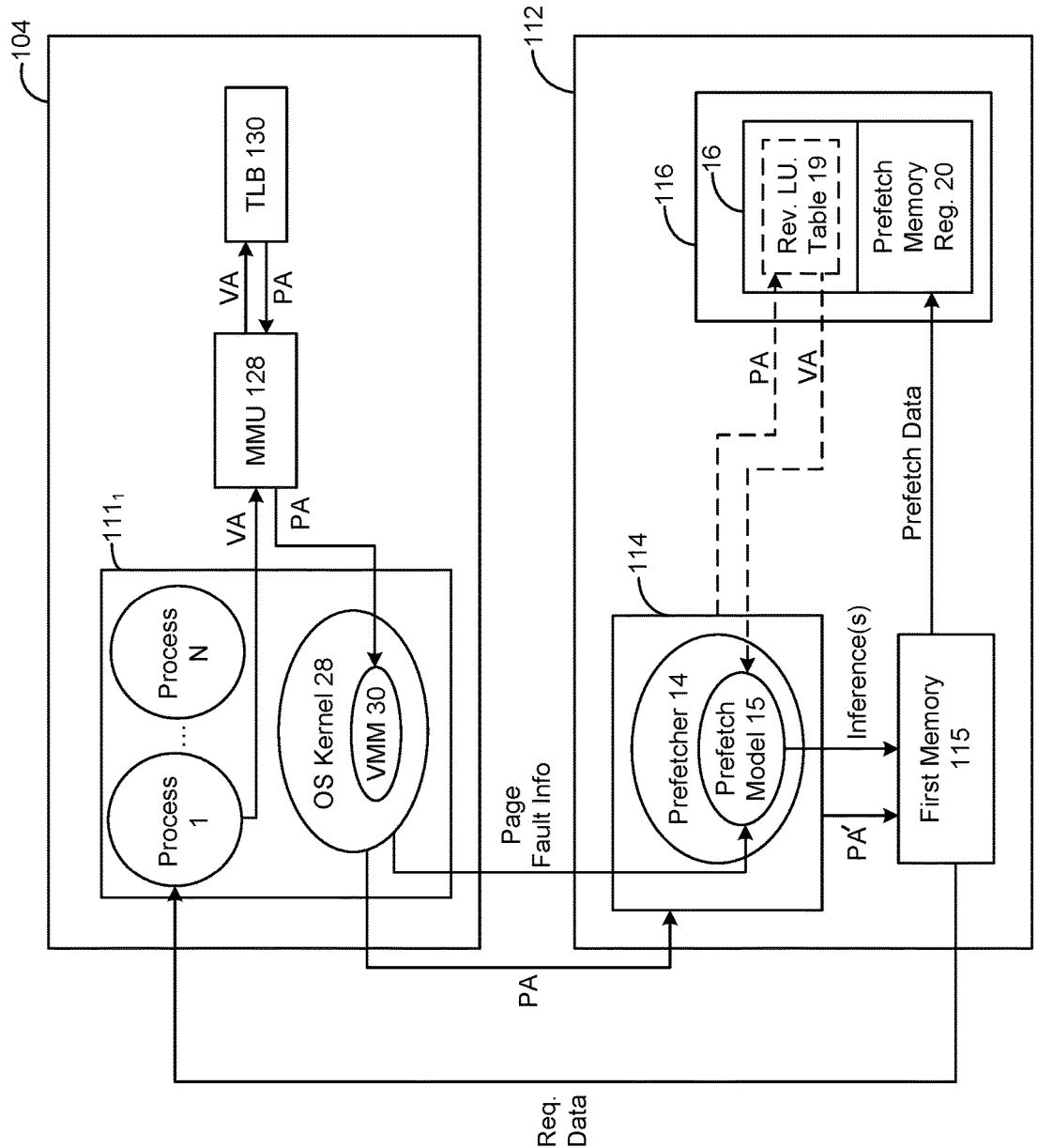
FIG. 3 is a data flow diagram for providing page fault information to a memory device according to one or more embodiments.

FIG. 3 is an example data flow diagram for providing page fault information from processor 104 to memory device 112 according to one or more embodiments. As shown in FIG. 3, process 1 of processes 1 to N executing on core $111_1$ requests data associated with a virtual address (i.e., VA in FIG. 3), which is provided to MMU 128 of processor 104 to translate into a physical address. MMU 128 uses TLB 130 to translate the virtual address to a physical address (i.e., PA in FIG. 3) that is passed by MMU 128 to an OS kernel 28 of OS 27 to retrieve the requested data from the system memory.

In the example of FIG. 3, OS kernel 28 includes a Virtual Machine Monitor (VMM) 30 that may determine from the physical address that the requested data is stored in first memory 115 of memory device 112, such as by comparing the physical address to address ranges used for first memory 115. VMM 30 then generates a page fault, which can result in a page fault exception handler of OS 27 collecting information about the request that caused the page fault generated by VMM 30. Unlike typical page faults, the physical address for the requested data stored in first memory 115 is mapped to the virtual address space of processor 104 and therefore was found in TLB 130 without having to use page table 12. However, the artificial triggering of a page fault by OS kernel 28 allows for additional information to be collected that can improve the prefetching of data into second memory 116 with prefetch model 15.

In other examples, OS kernel 28 may also use VMM 30 or a different VMM (not shown) to trigger a "major" page fault for requested data that is not stored in the system memory (i.e., memory or memories 106 and memory device 112). The requested data may then be retrieved from storage device 120 (shown in FIG. 1) and can be stored in the system memory for future use.

Returning to the example of FIG. 3, OS kernel 28 provides the physical address to controller 114 of memory device 112 to retrieve the requested data from first memory 115. In some implementations, controller 114 may translate the physical address into a device physical address (PA' in FIG. 3) using indirection table 22 (shown in FIG. 2) to access the requested data stored in first memory 115. The requested data is sent to host 102 from memory device 112, such as by using the CXL.mem protocol of CXL interconnect 103, after retrieving the requested data from first memory 115 so that it can be used by process 1, which generated the request.

In addition, OS kernel 28 provides the page fault information obtained by the OS to memory device 112, such as by using the CXL.cache protocol of CXL interconnect 103. Controller 114 and/or prefetcher 14 of memory device 112 provides the page fault information to prefetch model 15 for one or more inputs into prefetch model 15 to generate one or more inferences that are used to prefetch data from first memory 115 for caching in prefetch memory region 20 of second memory 116. The physical address for the prefetch data cached in second memory 116 may then be updated in page table 12 to reflect the physical address for the data in second memory 116 so that host 102 can access the data from second memory 116 instead of from first memory 115.

In some implementations, first memory 116 may use optional reverse lookup table 19 stored in host coherent memory region 16 to quickly translate the physical address or physical addresses received from OS kernel 28 into at least one virtual address used by host 102 for the requested data. In such implementations, the translated virtual address or addresses may then be used by prefetcher 14 as an input into prefetch model 15 to generate the inference(s) for the prefetch data and/or added to a collection of page fault information (e.g., collection 17 or collection 26 in FIG. 2) for training prefetch model 15. The physical address provided to memory device 112 in some cases may therefore serve as page fault information. Reverse lookup table 19 may additionally or alternatively be used for other page fault information received from host 102, such as a program counter value that may indicate a physical address for a next instruction to be fetched after the request causing the special page fault for data stored in first memory 115 but not cached in second memory 116.

As noted above, the use of the page fault information provided by host 102, such as a virtual address for the requested data, can improve the accuracy of the data predicted to be accessed by host 102 over a longer period of time, which can facilitate the use of a slower access memory (i.e., first memory 115) as part of the system memory. The use of such slower access memory can in some cases significantly increase the capacity of the system memory for a given cost and/or power usage without significantly affecting the performance of the system memory due to the caching of useful prefetch data in the faster access second memory 116.

Those of ordinary skill in the art will appreciate with reference to the present disclosure that other examples may differ from the example of FIG. 3. For example, a page fault may be generated for data that has not been mapped to the host's virtual address space but is stored in a secondary storage, such as in storage device 120 in FIG. 1. The OS of the host may then load the requested data into first memory 115 and may still use page fault information generated from the request to provide to memory device 112 for use as one or more inputs into prefetch model 15. In this regard, the collection of page fault information and/or the use of page fault information to generate inferences from prefetch model 15 may be expanded to include information from more traditional page faults for requested data that is not located in the system memory and is loaded into first memory 115 from a secondary storage, such as storage device 120.

Example Processes

Figure 4:
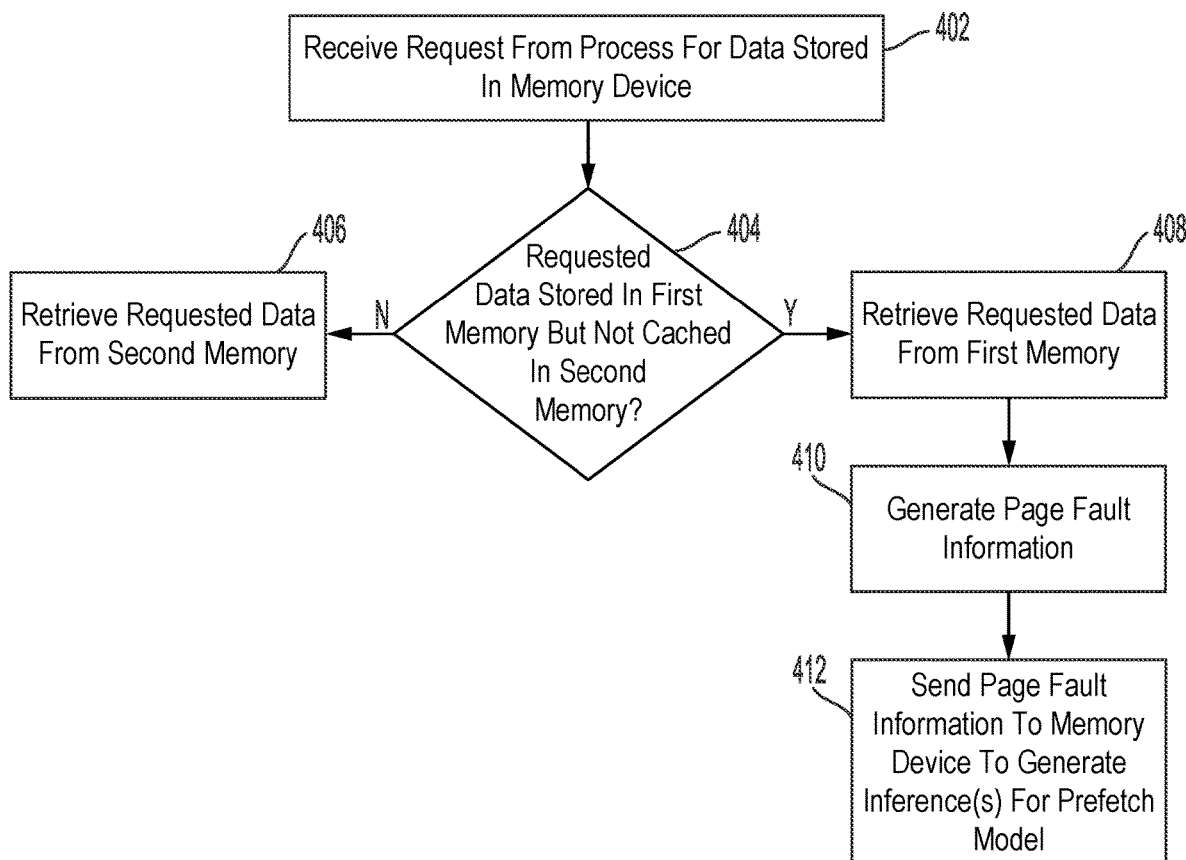
FIG. 4 is a flowchart for a page fault information generation process according to one or more embodiments.

FIG. 4 is a flowchart for a page fault information generation process according to one or more embodiments. The page fault information generation process of FIG. 4 may be performed by, for example, a processor of a host executing an OS (e.g., processor 104 in FIG. 2 executing OS 27).

In block 402, the processor receives a request for data from a process being executed by the processor. The requested data is stored in a memory device that includes a first memory and a second memory used to cache prefetched data from the first memory. A MMU of the processor may translate a virtual address or virtual addresses for the requested data into a corresponding physical address or physical addresses with help of a TLB.

In block 404, the processor determines whether the requested data is stored in the first memory but not cached in the second memory. In some implementations, the processor may use a VMM in an OS kernel of the host to compare one or more physical addresses for the requested data to address boundaries for the first memory to determine whether the requested data is stored in the first memory but not cached in the second memory. The VMM may also access a page table stored in the system memory in some implementations to determine the location of the requested data in the first memory. If the physical address indicates that the data is located in the second memory, the requested data is determined to be cached in the second memory. In such cases, the processor in block 406 retrieves the requested data from the second memory of the memory device.

On the other hand, if it is determined in block 404 that the requested data is stored in the first memory but not cached in the second memory, the processor in block 408 retrieves the requested data from the first memory of the memory device.

In block 410, the OS of the processor generates page fault information related to the request from the process, such as by using a page fault exception handler of the OS. The generated page fault information can include at least one of one or more virtual addresses for the requested data, one or more physical addresses for the requested data, a process ID identifying the process that generated the request, a thread ID identifying a thread that generated the request, such as a thread within the identified process, a program counter value indicating a physical address for a next instruction to be fetched after the request, and/or an indicator of a permission required for the requested data. As discussed above, such page fault information may already be generated by the OS when a page fault is triggered. However, unlike conventional systems, the VMM can trigger a page fault when the requested data is mapped to a virtual address space of the host but stored only in the first memory without having been cached in the second memory.

In block 412, the processor sends the generated page fault information to the memory device so that the memory device can use the page fault information to determine one or more inferences for a prefetch model. The one or more inferences may then be used by a prefetcher of the memory device to prefetch data based on the page fault information received from the host.

Those of ordinary skill in the art will appreciate with reference to the present disclosure that the order of blocks shown in FIG. 4 may differ in other implementations. For example, the generation of the page fault information in block 410 may be concurrent with the retrieval of the requested data in block 408. As another example variation, the memory device may not use all the page fault information it receives from the host to generate one or more inferences for prefetching data. In addition, the memory device may not use the prefetch model each time it receives page fault information from the host, but may instead selectively use page fault information based on an aggressiveness of prefetching data, which may be determined by a prefetcher of the memory device based on other criteria.

Figure 5:
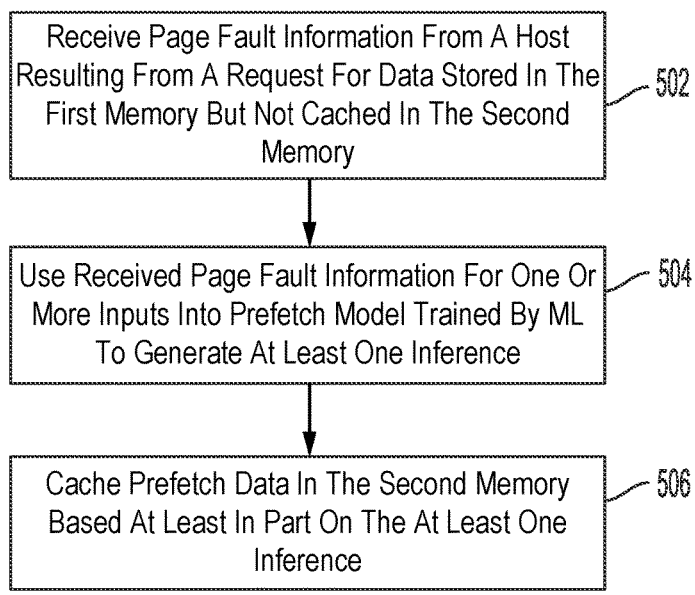
FIG. 5 is a flowchart for a prefetch process according to one or more embodiments.

FIG. 5 is a flowchart for a prefetch process according to one or more embodiments. The prefetch process of FIG. 5 may be performed by, for example, a controller 114 of memory device 112 executing prefetcher 14.

In block 502, a memory device receives page fault information from a host resulting from a request for data stored in a first memory but not cached in a second memory of the memory device. As discussed above, the page fault information can include, for example, at least one of a virtual address used by the host for the request that caused the page fault, a process ID indicating a process executed by the host that generated the request that caused the page fault, a thread ID indicating a thread executed by the host that generated the request that caused the page fault, a program counter value indicating at least one physical address for a next instruction that was to be fetched following the request that caused the page fault, at least one physical address in the memory device for the request that caused the page fault, and an indication of a permission for data to be accessed for the request that caused the page fault.

In block 504, the memory device uses the received page fault information for one or more inputs into a prefetch model trained by ML to generate at least one inference. In some cases, the one or more inputs can be the page fault information itself. In other cases, the one or more inputs may be derived from the page fault information, such as by comparing a program count value to a physical address for the requested data to determine a difference and using the difference as an input. The at least one inference generated by the prefetch model can be in some implementations the physical address or physical addresses for data to be prefetched from the first memory into the second memory. In other implementations, the one or more inferences can include, for example, a range of physical addresses or an indication of an offset value to use from a physical address associated with the requested data in prefetching data from the first memory.

In block 506, the memory device caches the prefetch data in the second memory based at least in part on the at least one inference generated by the prefetch model. The memory device may also consider other factors in determining the prefetch operation in addition to the one or more inferences. For example, and as discussed above, a prefetcher of the memory device may use OS metadata or memory access information to schedule when to prefetch the data or how much of the data should be prefetched, which may reflect a usage of data by a processor of the host.

Figure 6:
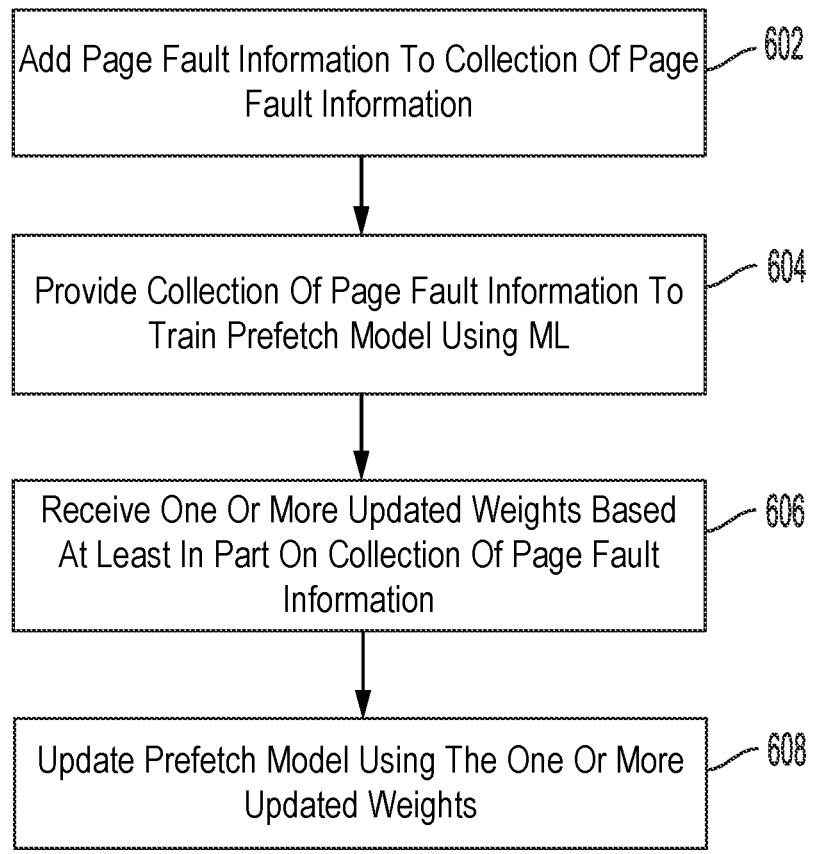
FIG. 6 is a flowchart for a prefetch model update process performed by a memory device according to one or more embodiments.

FIG. 6 is a flowchart for a prefetch model update process performed by a memory device according to one or more embodiments. The training process of FIG. 6 may be performed, for example, by a controller 114 of memory device 112.

In block 602, page fault information is added to a collection of page fault information. In some implementations, the page fault information may be added by the memory device to a collection of page fault information stored at the memory device (e.g., collection 17 in FIG. 2) after receiving the page fault information from the host for one or more inputs into a prefetch model. In other implementations, the host device may add the page fault information it generates to a collection of page fault information stored in a local host memory (e.g., collection 26 in FIG. 2).

As discussed above, the collection of page fault information may have a set buffer size so that additional page fault information may overwrite older page fault information if the set buffer size has been reached. In other implementations, reaching the set buffer size of the collection of page fault information may trigger the training of the prefetch model using the collection of page fault information. The addition of page fault information to the collection may also occur over a set period of time or for a predetermined number of memory accesses from the memory device, for example.

In block 604, the collection of page fault information is provided to a training module, which may be executed by the host or by the memory device, to train the prefetch model used to prefetch data from a first memory of the memory device to a second memory of the memory device. The provision of the collection in block 604 may not immediately follow the addition of the page fault information in block 602. The training or retraining of the prefetch model may be triggered by different events in different implementations, such as reaching a certain amount of page fault information, reaching a memory access performance level of the memory device (e.g., a miss rate for the second memory), reaching a predetermined period of time since a last prefetch, reaching a predetermined number of memory accesses from the memory device since a last prefetch, or reaching a predetermined amount of data accessed from the memory device by the host since a last prefetch.

The training may use the collected page fault information to determine memory access patterns for data that was stored in the first memory but not cached in the second memory of the memory device when requested by the host. In some implementations, the training module may be implemented by a "helper" core of the host (e.g., core $111_2$ of FIG. 2). Weights of the prefetch model may be updated by the training module based at least in part on the collection of page fault information.

As noted above, the additional information collected in the collection of page fault information, such as virtual addresses for requested data, can improve the prediction accuracy of the prefetch model as compared to prefetch algorithms that may not have such information to reveal or take advantage of the access patterns. In cases where the prefetch model is a neural network, the updated weights may correspond to weight values between neurons in the neural network. In addition, the host may also test run one or more applications to determine errors in the prefetch model and further update the weights based on the memory accesses made during the test run.

In block 606, the memory device receives one or more updated weights based at least in part on the collection of page fault information provided in block 604. The receipt of the updated one or more weights may occur after a break in the prefetch model update process by the memory device while the updated weights are determined by the training module executed at the host. The operation of the prefetch model may continue with the current weights to prefetch data from the first memory to the second memory while the weights are being updated by the host. In block 508, the controller of the memory device updates the prefetch model using one or more updated weights received from the host. The updated weights are then incorporated into the prefetch model for use in prefetching data from the first memory into the second memory.

Those of ordinary skill in the art will appreciate with reference to the present disclosure that other implementations of the prefetch model update process may differ than the example of FIG. 6. For example, the training module executed by the host may determine in some implementations that the updated weights do not vary by more than a threshold value from the current weights of the prefetch model. In such cases, the training module may not provide the updated weights to the memory device since the updating of the prefetch model may not be statistically significant to improve performance or may cause a temporary delay in the prefetching of data for a relatively minor update to the prefetch model.

Figure 7:
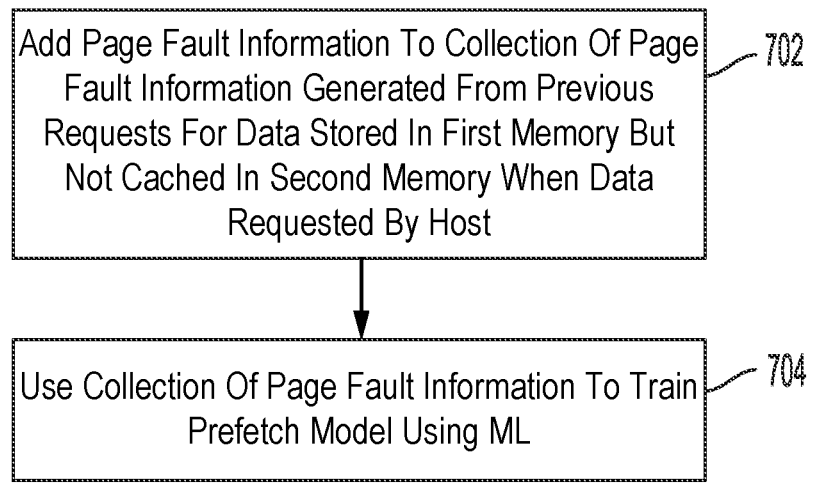
FIG. 7 is a flowchart for an ML training process performed by a host for a prefetch model according to one or more embodiments.

FIG. 7 is a flowchart for an ML training process performed by a host for a prefetch model according to one or more embodiments. The training process of FIG. 7 may be performed by, for example, a processor of a host executing a training module (e.g., processor 104 in FIG. 2 executing training module 24). In some implementations, the training process may be performed by a "helper" core of the processor (e.g., core $111_2$ of processor 104 in FIG. 2) while another core of the processor (e.g., core $111_1$ in FIG. 2) continues to execute processes that access the system memory.

In block 702, a processor of the host adds page fault information generated by the host to a collection of page fault information. The collection of page fault information includes page fault information generated from previous requests for data stored in a first memory of a memory device but not cached in a second memory of the memory device when the data was requested by the host.

In block 704, the collection of page fault information is used to train a prefetch model used by the memory device for prefetching data from the first memory to the second memory. A training module executed by the processor (e.g., training module 24) can use the collection of page fault information as at least part of the training data for training the prefetch model. The collection of page fault information may serve in some implementations as at least part of a history buffer. The training module may also perform certain preprocessing on the page fault information, such as by calculating delta values between virtual and/or physical addresses included in the page fault information. The training module may also, for example, map addresses to latent vectors and use a sequence model, such as a LSTM model or a transformer model for training the prefetch model.

Those of ordinary skill in the art will appreciate with reference to the present disclosure that other implementations of the ML training process of FIG. 7 may differ. In addition, the use of the collection of the page fault information in block 704 may not immediately follow the addition of the page fault information in block 702. In most cases, the training of the prefetch model may occur after more page fault information has been added to the collection to reach a predetermined amount of page fault information or in response to a triggering event for training, such as reaching a memory access performance level of the memory device (e.g., a miss rate for the second memory), a predetermined period of time, or a predetermined amount of memory accesses at the memory device.

Figure 8:
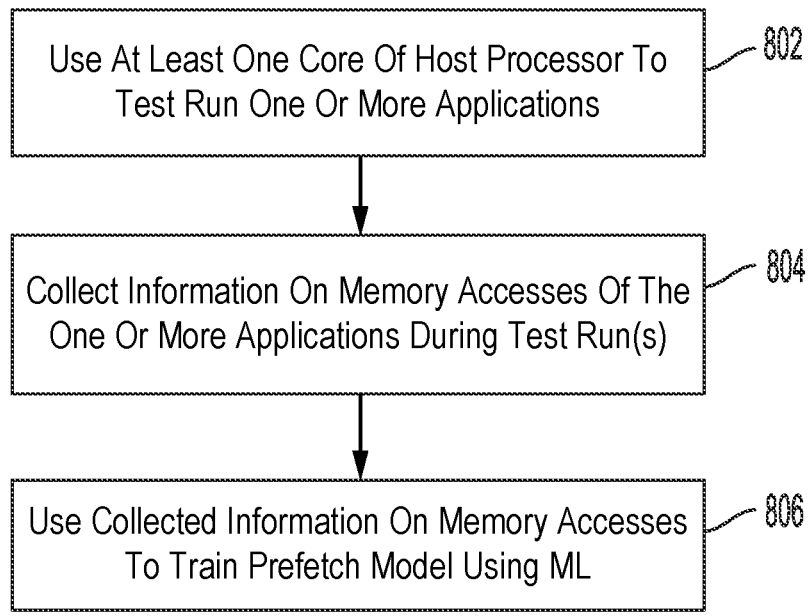
FIG. 8 is a flowchart for an ML training process based on test run memory access patterns according to one or more embodiments.

FIG. 8 is a flowchart for an ML training process based on memory access patterns according to one or more embodiments. The training process of FIG. 8 may be performed by, for example, a processor of a host executing a training module (e.g., processor 104 in FIG. 2 executing training module 24). As with the training process of FIG. 7 discussed above, the training process of FIG. 8 may also be performed by a "helper" core of the processor (e.g., core $111_2$ of processor 104 in FIG. 2) while another core of the processor (e.g., core $111_1$ in FIG. 2) continues to execute processes that access the system memory.

In block 802, one or more applications are test run by at least one core of a host processor. The test run or test runs may be performed in advance of running the one or more applications in response to a user request to run the application or applications. In block 804, the processor collects information on memory accesses requested by the one or more applications during the test run or test runs. The collected information can include, for example, statistics such as memory request rates or other memory access information, such as virtual addresses requested by the application or applications during the test run or test runs.

In block 806, the collected information is used to train a prefetch model for a memory device using ML. The collected information may reflect memory access patterns for the applications that can be used in the prefetch model. For example, certain processes of the applications may have memory access patterns that can be determined and later used by the prefetch model by identifying a particular process ID for the application in page fault information received from the host. This information may then allow the prefetch model to more accurately prefetch data that is predicted to be needed by a particular process.

Figure 9:
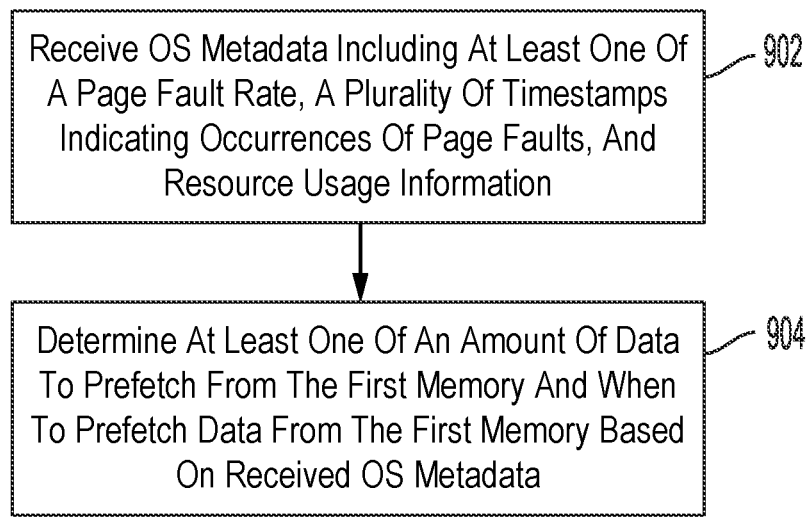
FIG. 9 is a flowchart for a prefetch adjustment process according to one or more embodiments.

FIG. 9 is a flowchart for a prefetch adjustment process according to one or more embodiments. The prefetch adjustment process of FIG. 9 can be performed by, for example, a controller of a memory device (e.g., controller 114 of memory device 112 in FIG. 2 executing prefetcher 14). In some implementations, the prefetcher can include a separate hardware component and considered a controller of the memory device. In other implementations, the prefetcher can include a module executed by a controller of the memory device.

In block 902, the memory device receives OS metadata (e.g., OS metadata 10 in FIG. 1) from a host indicating at least one of a page fault rate, a plurality of timestamps indicating occurrences of page faults, and resource usage information. The resource usage information can include, for example, memory access rates or processor scheduling information indicating an activity level of the host.

In block 904, the controller of the memory device determines, based on the received OS metadata, at least one of an amount of data to prefetch from a first memory of the memory device and when to prefetch data from the first memory device. This consideration of OS metadata can enable the prefetcher to tailor its prefetching to the memory consumption or bandwidth of the host. For example, the OS metadata may include timestamps for page faults that were generated by a VMM of the OS for data stored in the first memory but not cached in the second memory. The prefetcher of the memory device may calculate a rate for these types of page faults and adjust how frequently data is prefetched from the first memory into the second memory based on the calculated page fault rate.

In some implementations, page fault information received from the host may only be used for inputs into the prefetch model when prefetching is scheduled by the prefetcher such that not all the page fault information received from the host may be used for inputs into the prefetch model, even though such page fault information may be added to a collection of page fault information for training the prefetch model.

The foregoing use of page fault information from the host can facilitate use of a slower access memory, such as NAND flash, for a main system memory since the prefetching of data from the slower access memory can be improved by prefetching data that will remain useful (i.e., needed by the host) for a longer timeframe. The use of the OS of the host to collect information that may typically be collected for page faults, such as virtual addresses, can take advantage of memory access patterns that may not otherwise be apparent or usable by ML that only considers physical addresses. As discussed above, the sharing of such page fault information and other host OS information can be facilitated with CXL so that such OS information can be quickly shared between the host and the memory device.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:
1. A memory device, comprising:
 a first memory configured to store data;
 a second memory configured to cache data stored in the first memory; and
 at least one controller, individually or in combination, configured to:
  receive page fault information from a host, wherein the page fault information results from a request for data by the host that is stored in the first memory but is not cached in the second memory when requested by the host;
  use the received page fault information for one or more inputs into a prefetch model trained by Machine Learning (ML) to generate at least one inference;
  based at least in part on the at least one inference, cache prefetch data in the second memory that is stored in the first memory;
  receive Operating System (OS) metadata from an OS of the host including at least one of a page fault rate, a plurality of timestamps indicating occurrences of page faults, and resource usage information; and
  based on the received OS metadata, determine at least one of an amount of data to prefetch from the first memory to cache in the second memory and when to prefetch data from the first memory to cache in the second memory.

2. The memory device of claim 1, wherein the received page fault information includes at least one virtual address used by the host for the requested data.

3. The memory device of claim 1, wherein the at least one controller, individually or in combination, is further configured to:
add the received page fault information to a collection of page fault information received from the host; and
provide the collection of page fault information to the host to train the prefetch model using ML.

4. The memory device of claim 3, wherein the at least one controller, individually or in combination, is further configured to:
receive one or more updated weights from the host based on the collection of page fault information provided to the host; and
update the prefetch model using the one or more received updated weights.

5. The memory device of claim 1, wherein the page fault information includes at least one of a process ID indicating a process executed by the host that generated a request that caused a page fault, a thread ID indicating a thread executed by the host that generated the request that caused the page fault, a program counter value indicating at least one physical address for a next instruction that was to be fetched following the request that caused the page fault, at least one physical address in the memory device for the request that caused the page fault, and an indication of a permission for data to be accessed for the request that caused the page fault.

6. The memory device of claim 1, wherein the at least one controller, individually or in combination, receives the page fault information from the host using a Compute Express Link (CXL) protocol.

7. The memory device of claim 1, wherein the second memory includes a host coherent memory region, a prefetch memory region, and an indirection table memory region for mapping data stored in the first memory.

8. The memory device of claim 1, wherein the second memory stores a reverse lookup table and wherein the at least one controller, individually or in combination, is further configured to:
receive at least one physical address from the host as at least part of the received page fault information;
use the reverse lookup table to translate the at least one physical address into at least one virtual address used by the host for the data requested by the host; and
use the at least one virtual address for at least one of an input into the prefetch model and a collection of page fault information for training the prefetch model.

9. A method, comprising:
determining whether data requested by a process is stored in a first memory of a memory device but is not cached in a second memory of the memory device;
in response to determining that the requested data is stored in the first memory but is not cached in the second memory, generating page fault information related to a request for the requested data;
sending the page fault information to the memory device, wherein the memory device uses the page fault information to generate at least one inference from a prefetch model for caching prefetch data in the second memory, and
wherein the page fault information sent to the memory device includes at least one of a thread ID indicating a thread that generated the request, a program counter value indicating at least one physical address for a next instruction that was to be fetched following the request, and an indicator of a permission for the requested data, further comprising sending OS metadata from the OS of a host executing the process to the memory device, wherein the OS metadata includes at least one of a page fault rate, a plurality of timestamps indicating occurrences of page faults, and resource usage information, and wherein the memory device uses the OS metadata to determine at least one of an amount of data to prefetch from the first memory to cache in the second memory and when to prefetch data from the first memory to cache in the second memory.

10. The method of claim 9, wherein the page fault information sent to the memory device includes at least one virtual address used by a host executing the process for the requested data.

11. The method of claim 9, wherein the page fault information sent to the memory device further includes at least one of a process ID indicating the process that generated the request and at least one physical address in the memory device for the requested data.

12. The method of claim 9, wherein a host executing the process sends the page fault information to the memory device using a Compute Express Link (CXL) protocol.

13. The method of claim 9, further comprising:
adding the page fault information to a collection of page fault information generated from previous requests for data by a host executing the process that is stored in the first memory of the memory device but is not cached in the second memory of the memory device when the data is requested by the host; and
using the collection of page fault information to train the prefetch model using Machine Learning (ML).

14. The method of claim 9, further comprising:
using at least one core of a host processor executing the process, individually or in combination, to test run one or more applications;
collecting information on memory accesses of the one or more applications during the test run; and
using the collected information on memory accesses to train the prefetch model using ML.

15. The method of claim 9, wherein the page fault information includes at least one physical address in the memory device for the data to be accessed by the request, and wherein an Operating System (OS) of a host executing the process uses a page size greater than or equal to two megabytes.

16. A system, comprising:
a memory device including:
a first memory configured to store data; and
a second memory configured to cache data stored in the first memory and to store a reverse lookup table;
a host configured to:
determine whether data requested by the host is stored in the first memory of the memory device but is not cached in the second memory of the memory device;
in response to determining that the requested data is stored in the first memory of the memory device but is not cached in the second memory of the memory device, generate page fault information related to the request for data; and
send at least one physical address to the memory device as at least part of the generated page fault information;
means for using the reverse lookup table to translate the at least one physical address into at least one virtual address used by the host for the data requested by the host; and means for using the at least one virtual address for at least one of an input into a prefetch model for caching prefetch data in the second memory and a collection of page fault information for training the prefetch model.

17. The system of claim 16, wherein the memory device is further configured to:
use at least a portion of the page fault information to generate at least one inference from the prefetch model for caching prefetch data in the second memory.

18. The system of claim 17, wherein the at least a portion of the page fault information used by the memory device to generate at least one inference from the prefetch model includes at least one of a thread ID indicating a thread executed by the host that generated the request for data, a program counter value indicating at least one physical address for a next instruction that was to be fetched following the request for data, and an indication of a permission for the requested data.

19. A method, comprising:
determining whether data requested by a process is stored in a first memory of a memory device but is not cached in a second memory of the memory device;
in response to determining that the requested data is stored in the first memory but is not cached in the second memory, generating page fault information related to a request for the requested data;
sending the page fault information to the memory device, wherein the memory device uses the page fault information to generate at least one inference from a prefetch model for caching prefetch data in the second memory, and
wherein the page fault information sent to the memory device includes at least one of a thread ID indicating a thread that generated the request, a program counter value indicating at least one physical address for a next instruction that was to be fetched following the request, and an indicator of a permission for the requested data, further comprising:
sending the at least one physical address to the memory device as at least part of the page fault information,
wherein the memory device uses a reverse lookup table to translate the at least one physical address into at least one virtual address used by a host for the requested data and uses the at least one virtual address for at least one of an input into the prefetch model and a collection of page fault information for training the prefetch model.

\* \* \* \* \*